United States Patent
Chambers et al.

(10) Patent No.: US 11,655,937 B2
(45) Date of Patent: May 23, 2023

(54) MAGNETIC MOUNTING BRACKET

(71) Applicant: BOSS LTG, INC., Baton Rouge, LA (US)

(72) Inventors: Todd D. Chambers, Baton Rouge, LA (US); Layne P. Yander, Gonzales, LA (US)

(73) Assignee: BOSS LTG, INC., Baton Rouge, LA (US)

( * ) Notice: Subject to any disclaimer, the term of this patent is extended or adjusted under 35 U.S.C. 154(b) by 0 days.

(21) Appl. No.: 17/522,389

(22) Filed: Nov. 9, 2021

(65) Prior Publication Data

US 2022/0205587 A1    Jun. 30, 2022

Related U.S. Application Data

(63) Continuation of application No. 16/840,742, filed on Apr. 6, 2020, now Pat. No. 11,168,835.

(60) Provisional application No. 62/830,649, filed on Apr. 8, 2019.

(51) Int. Cl.
    *F16M 13/02*    (2006.01)
(52) U.S. Cl.
    CPC ................ *F16M 13/022* (2013.01)
(58) Field of Classification Search
    None
    See application file for complete search history.

(56) References Cited

U.S. PATENT DOCUMENTS

| | | | | |
|---|---|---|---|---|
| 3,638,889 A | * | 2/1972 | Samuelson | G03B 17/561 396/419 |
| 4,648,698 A | * | 3/1987 | Iwasaki | F16M 13/00 396/419 |
| 4,907,769 A | * | 3/1990 | Hunley, Jr. | F21V 21/145 248/185.1 |
| 5,039,050 A | * | 8/1991 | Eidschun | B60R 11/04 396/419 |
| 5,647,565 A | * | 7/1997 | Wei | F16M 11/10 248/168 |
| 6,234,434 B1 | * | 5/2001 | Avinger | F16M 11/22 248/188.7 |
| 6,491,266 B1 | * | 12/2002 | Chen | F16M 11/245 248/188.7 |
| 6,669,353 B2 | * | 12/2003 | Kung | F21V 21/06 362/208 |
| 7,364,320 B2 | * | 4/2008 | Van Deursen | F16M 13/005 362/398 |
| 7,669,814 B2 | * | 3/2010 | Bogel | F16M 11/242 248/188.7 |

(Continued)

*Primary Examiner* — Monica E Millner
(74) *Attorney, Agent, or Firm* — Roy Kiesel Ford Doody & North, APLC

(57) ABSTRACT

Various embodiments relate to a mounting bracket for supporting a light source on a magnetic wall structure, the magnetic mounting bracket comprising: (a) base having a first magnetic contact positioned on a bottom surface of the base; (b) an arm mount affixed to the base; (c) a light mount affixed to the base; (d) at least one arm pivotally fixed to the arm mount; and (e) a pad pivotally connected to an extending end of the at least one arm, each pad having a second magnetic contact positioned on a contact surface of each pad. Various embodiments further relate to a method of supporting a light source on a magnetic wall structure.

8 Claims, 18 Drawing Sheets

(56) References Cited

U.S. PATENT DOCUMENTS

| | | | | |
|---|---|---|---|---|
| 8,137,008 | B1* | 3/2012 | Mallano | F16M 11/18 |
| | | | | 52/110 |
| 8,831,415 | B2* | 9/2014 | Greenthal | F16M 11/2078 |
| | | | | 396/419 |
| 8,939,602 | B2* | 1/2015 | Wessel | F21L 4/045 |
| | | | | 362/208 |
| 9,052,103 | B2* | 6/2015 | Hwang | F16M 11/08 |
| 9,577,417 | B2* | 2/2017 | Stechmann | F16B 1/00 |
| 10,337,666 | B2* | 7/2019 | Reitberger | F21V 21/32 |
| 10,718,997 | B2* | 7/2020 | Kiernan-Lewis | |
| | | | | F16M 11/2021 |
| 10,927,999 | B1* | 2/2021 | Wojcik | F16M 11/16 |
| 11,168,835 | B2* | 11/2021 | Chambers | F16M 13/022 |
| 2008/0191105 | A1* | 8/2008 | Bogel | F16M 11/16 |
| | | | | 248/170 |
| 2010/0039801 | A1* | 2/2010 | Pelletier | F21L 2/00 |
| | | | | 362/184 |
| 2011/0304519 | A1* | 12/2011 | Klein | F16M 11/22 |
| | | | | 343/890 |
| 2014/0103169 | A1* | 4/2014 | Heard | F16M 13/02 |
| | | | | 248/65 |
| 2014/0288694 | A1* | 9/2014 | Wagner | F16M 11/18 |
| | | | | 248/550 |
| 2017/0350553 | A1* | 12/2017 | Wargo | H01Q 1/1221 |
| 2019/0126846 | A1* | 5/2019 | Yerdon | F16B 7/1454 |
| 2019/0146312 | A1* | 5/2019 | Kiernan-Lewis | G03B 17/561 |
| | | | | 396/428 |
| 2022/0082117 | A1* | 3/2022 | Stechmann | F16B 5/0004 |

* cited by examiner

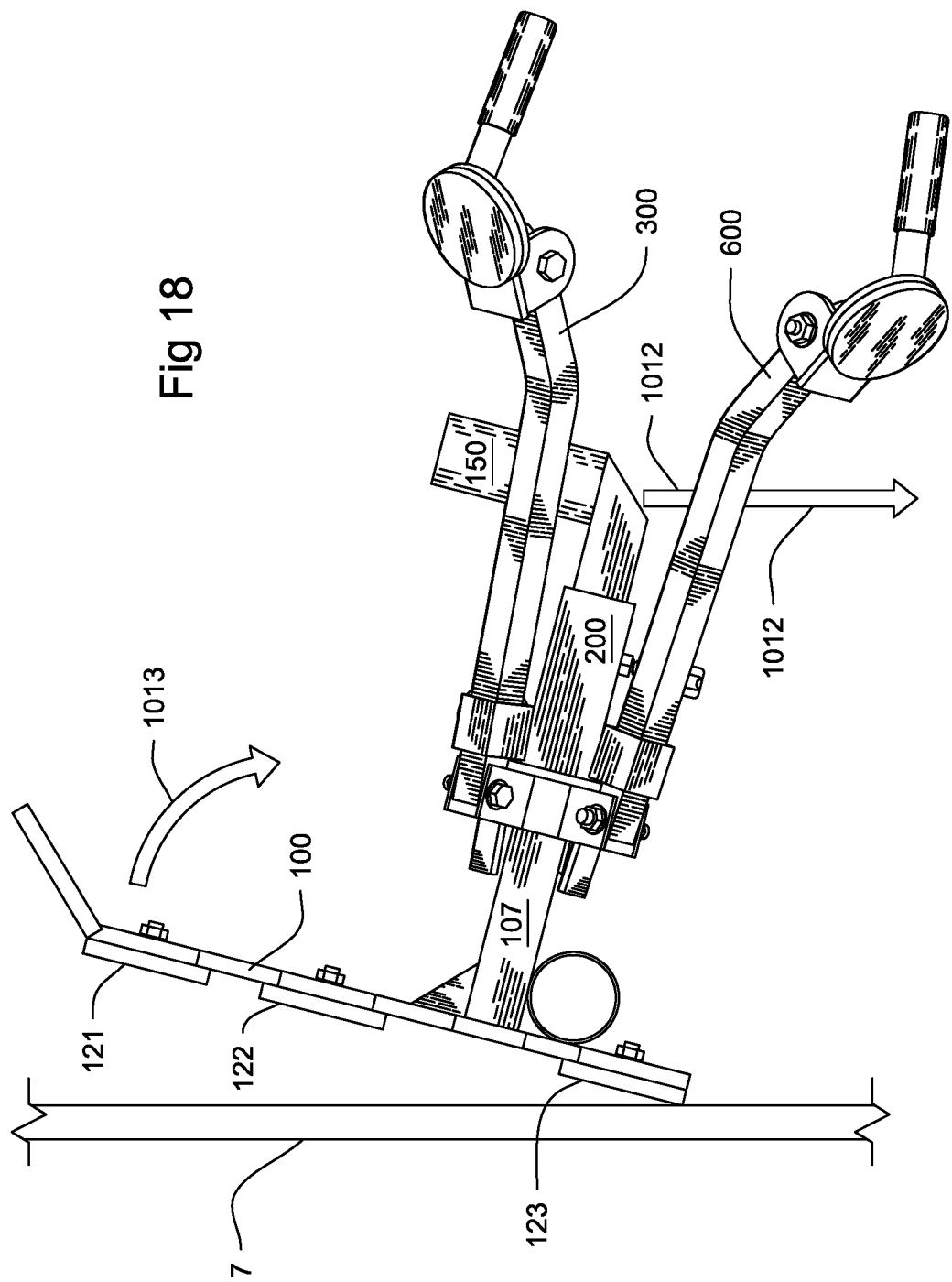

MAGNETIC MOUNTING BRACKET

CROSS REFERENCE TO RELATED APPLICATIONS

This application claims the benefit of U.S. Provisional Application No. 62/830,649, filed on Apr. 8, 2019, and U.S. patent application Ser. No. 16/840,742, filed on Apr. 6, 2020, which is now U.S. Pat. No. 11,168,835, all of which are hereby incorporated by reference in their entirety.

BACKGROUND OF THE INVENTION

Field of Invention

Various embodiments relate to a mounting bracket for supporting a light source on a magnetic wall structure. Various embodiments further relate to a method of supporting a light source on a magnetic wall structure.

Prior Art

There has been a long felt need in various industries, such as the chemical industry, for safer methods to clean large chemical tanks or similar vessels. Vessels such as commercial chemical tanks designed to permit persons to enter the interior of the tank for cleaning purposes, hereinafter vessel or chemical tank, are almost always windowless requiring the temporary installation of lighting systems to permit the persons to see the interior tank wall surfaces and floor that are to be cleaned generally utilizing high pressure sprays. The interior tank wall is commonly made from a magnetic material such as stainless steel forming a magnetic wall structure.

The prior art lighting systems include hand lamps hung from internal scaffolding within a vessel. There is a need to provide a location in closer proximity to the interior wall surface of a vessel. Therefore, it is an objective of this invention to provide a light mount which will attach to the interior wall surface of a vessel.

The interior wall of a chemical tank may contain a film, layer, or cake of chemical residue. It is yet another objective of this invention to provide a light bracket that provides a secure attachment without falling, slipping, sliding or otherwise losing its position against the interior wall of a chemical tank without damaging the interior wall of the chemical tank.

Chemical tanks range in geometry and size. In geometry, some are cylindrical and other spherical. In size, processing vessels, storage vessels, and transportation vessels vary considerably in magnitude between a diameter of less than 50 feet to a diameter greater than 300 feet. Therefor it is an object of this invention to provide a light mount which will attach to the interior wall surface of commercial chemical vessels across a wide range of sizes and that are either cylindrical or spherical in geometry.

It is further an object of this invention to provide a light mount adaptable between a variety of magnetic wall structures including the interior wall surface of a cylindrical or spherical vessel, the exterior wall surface of a cylindrical or spherical vessel, and a planar wall surface. It is a further objective of this invention to provide a light bracket that can be simultaneously mounted to different surfaces forming the interior surfaces of the tank wall.

Other advantages and objectives of the invention are inherent or obvious to a person of ordinary skill in the art from the ensuing descriptions of the invention.

SUMMARY OF THE INVENTION

Various embodiments relate to a magnetic mounting bracket for supporting a light source. Various embodiments further relate to a method of supporting a light source on a magnetic wall structure.

In various embodiments of the apparatus, the magnetic mounting bracket comprising: (a) base having a first magnetic contact positioned on a bottom surface of the base; (b) an arm mount affixed to the base; (c) a light mount affixed to the base; (d) at least one arm pivotally fixed to the arm mount; and (e) at least one pad each pivotally connected to an extending end of the at least one arm, each of the at least one pad having a second magnetic contact positioned on a contact surface of the at least one pad.

BRIEF DESCRIPTION OF THE DRAWINGS

FIG. 18 is a side view of the mounting bracket of FIG. 17 being removed from a magnetic wall structure.

DETAILED DESCRIPTION OF THE DRAWINGS

Apparatus

Figure 1:
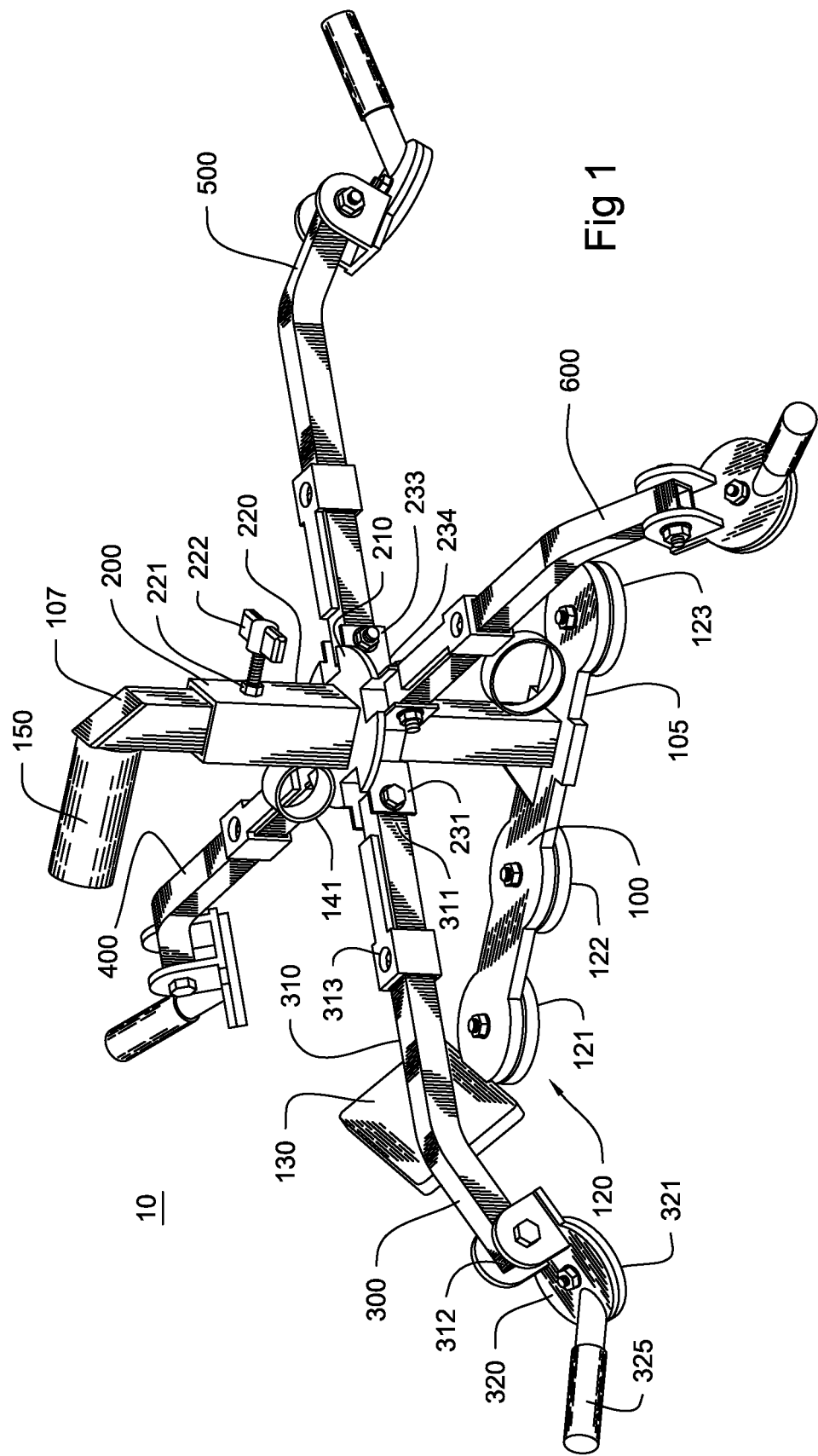
FIG. 1 is a view of the mounting bracket with the arms extended along a horizontal plane.

In various embodiments of the apparatus, mounting bracket 10 comprises: (a) base 100 having first magnetic contact 120 affixed to bottom surface 105 of base 100; (b) arm mount 200 affixed to base 100; (c) light mount 150 affixed to base 100; (d) arm assembly 300 pivotally fixed to arm mount 200; and (e) pad 320 pivotally connected to an extending end of arm assembly 300, pad 320 having second magnetic contact 321.

In various embodiments of the apparatus, mounting bracket 10 includes plurality of arm assemblies 300, 400, 500, 600, each pivotally fixed to and spaced about arm mount 200; a plurality of pads 320, 420, 520, 620 each pivotally connected to an extending end of an arm assembly 300, 400, 500, 600; and each pad 320, 420, 520, 620 having a second magnetic contact 321, 421, 521, 621. The figures depict one embodiment of the mounting bracket 10 with four arm assemblies 300, 400, 500, 600. Neither the apparatus nor the method is dependent on the apparatus having four arm assemblies 300, 400, 500, 600. Further the method is not dependent on all arms 300, 400, 500, 600 being used to secure the mounting bracket 10 to a magnetic wall structure.

In various embodiments of the apparatus, base 100 is an elongated metal strip. In various embodiments of the apparatus, first magnetic contact 120 is a plurality of magnets 121, 122, 123 affixed to the bottom surface 105 of base 100. In various embodiments of the apparatus, each of the plurality of magnets 121, 122, 123 is a magnetic disk with a centrally located threaded shaft to affix the plurality of magnets to base 100. In various embodiments of the apparatus, each of the plurality of magnets 121, 122, 123 are rubber coated.

In various embodiments of the apparatus, first magnetic contact 120 creates a first magnetic bond with magnetic wall structure 7, the first magnetic bond being strong enough to at least support the weight of mounting bracket 10 against magnetic wall structure 7. In various embodiments of the apparatus, first magnetic bond is strong enough to at least support the weight of mounting bracket 10 and light source 7 against the magnetic wall structure. The interior wall surface of a chemical tank may include a film, layer, or cake of chemical residue. In various embodiments of the apparatus, first magnetic contact 120 will support mounting bracket 10 against magnetic wall structure 7 without falling, slipping, sliding or otherwise losing its position against the magnetic wall structure 7.

The required strength of the bond between first magnetic contact 120 and magnetic wall structure 7 will vary subject to, among other considerations not included, the composition or type of magnet forming first magnetic contact 120; the composition of magnetic wall structure 7; the presence of any material between first magnetic contact 120 and magnetic wall structure 7 such as residual film or layers from chemical processing; the contact area between first magnetic contact 120 and magnetic wall structure 7; the weight of mounting bracket 10 and light source 5; and any additional factors of safety for among others the forceable pulling or jerking of mounting bracket 10 from magnetic wall structure 7.

Figure 2:
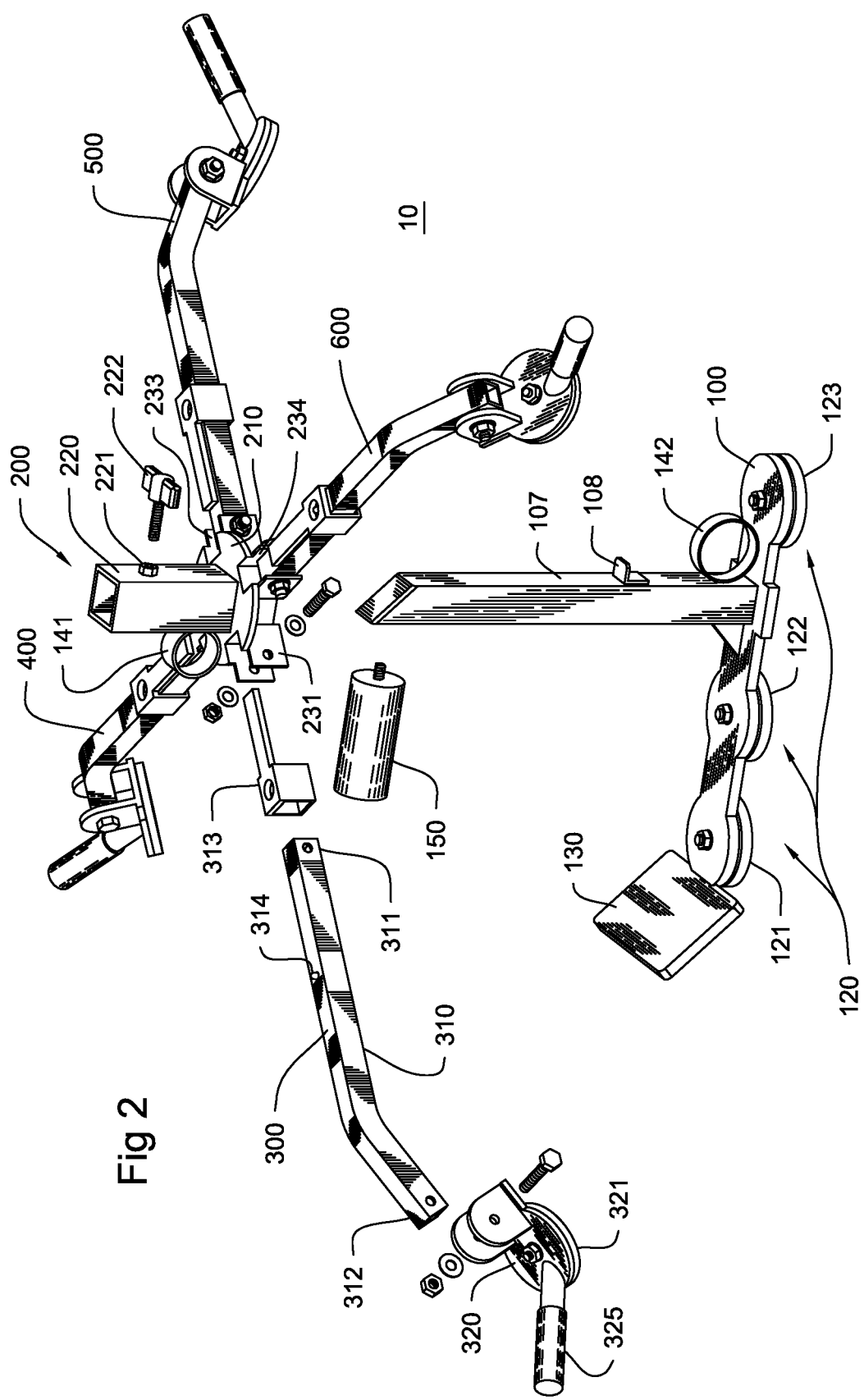
FIG. 2 is an exploded view of the mounting bracket of FIG. 1.

In various embodiments of the apparatus, base 100 further includes post 107 affixed to base 100 wherein arm mount 200 is slidably affixed to the post 107. In various embodiments of the apparatus, post 107 further includes stop 108 (FIG. 2) spacing arm mount 200 from bottom surface of base 100. In various embodiments of the apparatus, post 107 is affixed to a below center position on base 100 when base is positioned adjacent a magnetic wall structure. In various embodiments of the apparatus, light mount 150 is affixed to the post 107 at a position opposite base 100.

In various embodiments of the apparatus, arm mount 200 includes first arm bracket 231 for pivotally attaching at least one arm assembly 300. In various embodiments of the apparatus, arm mount 200 includes arm bracket 231, 232, 233, 234 for pivotally attaching at least one arm assembly 300, 400, 500, 600. In various embodiments of the apparatus, plate 210 supports bracket 231 to arm mount 200.

In various embodiments of the apparatus, mounting bracket 10 further includes a fastening mechanism to secure arm mount 200 to post 107. In various embodiments of the apparatus, the fastening mechanism includes threaded fastener 222 and threaded bore 221 passing through hollow tube member 220 wherein when fastener 222 is threaded through bore 221 and positioned against post 107, fastener 222 prevents arm mount 200 from sliding on post 107.

Figure 3:
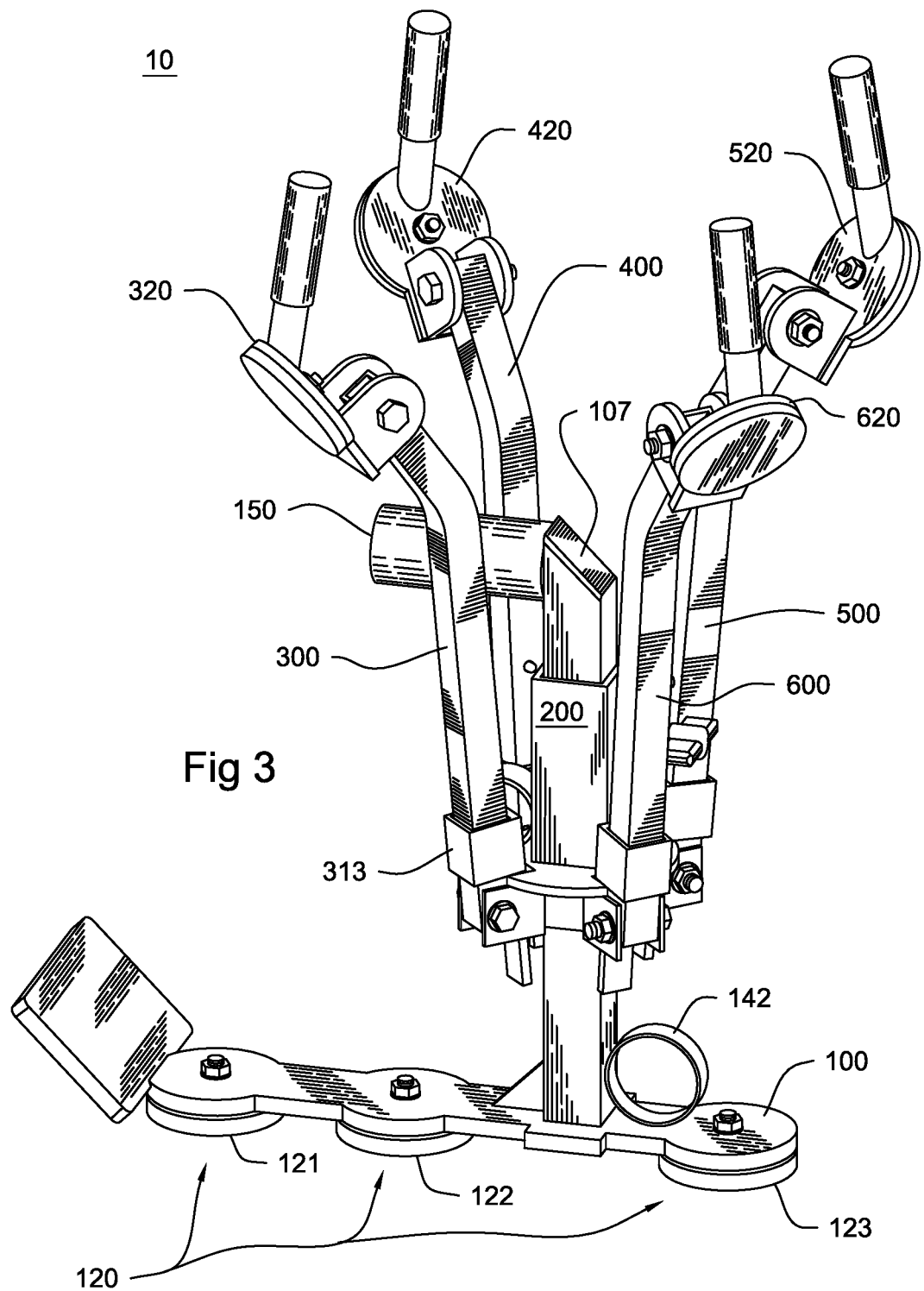
FIG. 3 is the mounting bracket of FIG. 1 with the arms in a folded configuration.
Figure 4:
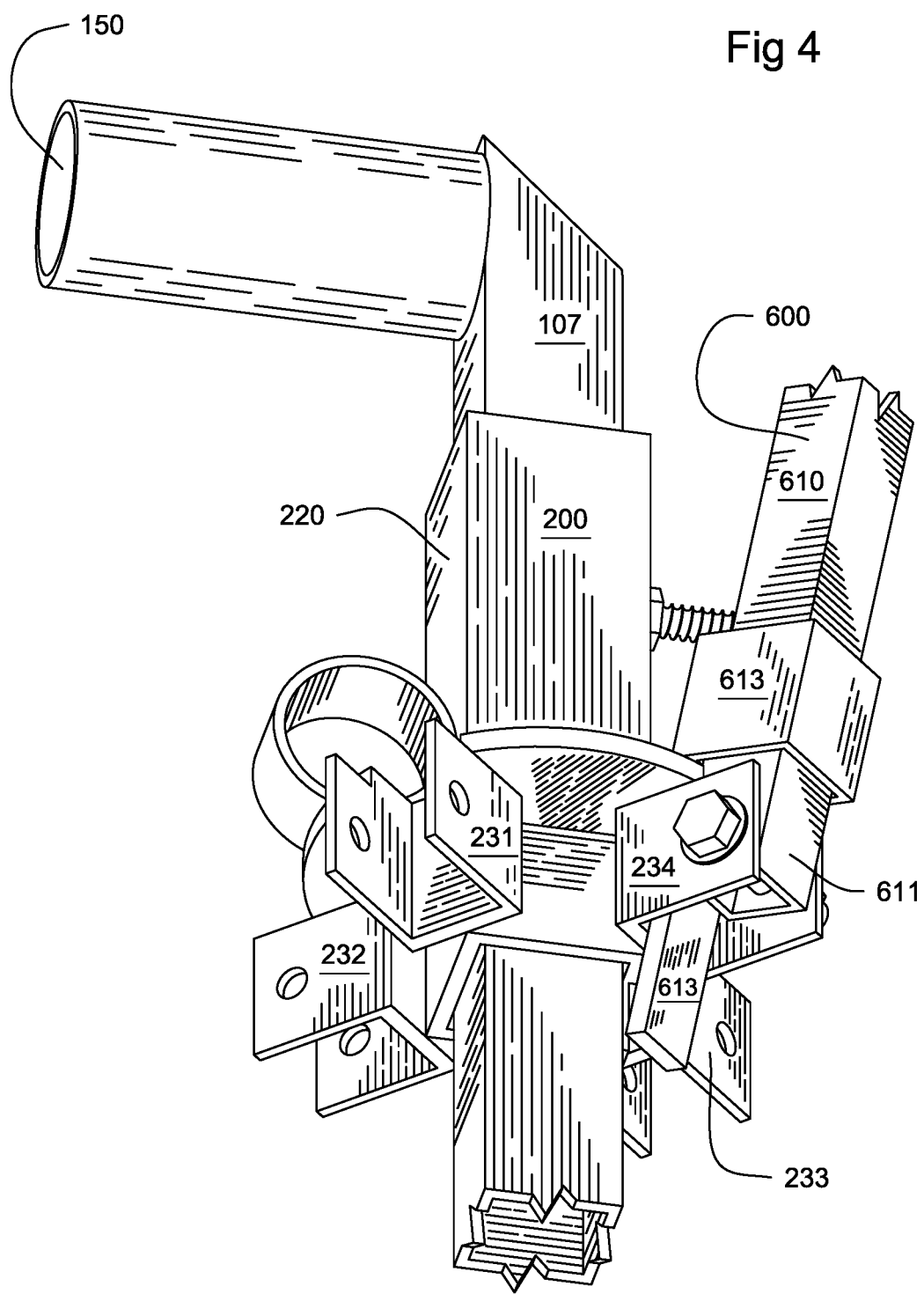
FIG. 4 is a select view of the mounting bracket of FIG. 3 depicting one arm in the folded configuration with a locking bar positioned between an arm and an arm mount, the remaining arms removed for clarity.

In various embodiments of the apparatus, arm assembly 300 includes arm 310 having first end 311 pivotally connected to arm bracket 231 and second end 312 extending from the arm mount 200 and pivotally connected to pad 320. In various embodiment of the apparatus, arm assembly 300 further includes locking bar 313 slidably affixed to arm, wherein locking bar 313 holds arm 310 in a folded configuration when it is positioned between arm 310 and arm mount 200 (FIGS. 3 and 4 depicting arm assembly 600 in the folded configuration). In various embodiment of the apparatus, when locking bar 313 is positioned between arm 310 and arm mount 200, locking bar 313 is also positioned between arm 310 and bracket 231. In various embodiments of the apparatus, arm assembly 300 further includes ball plunger 314 for securing locking bar 313 in a position on arm 310 to prevent locking bar 313 from becoming positioned between arm 310 and arm mount 200.

In various embodiments of the apparatus, pad 320 further includes second magnetic contact 321. In various embodiments of the apparatus, second magnetic contact 321 is a magnet disk with a centrally located threaded shaft to affix the second magnetic contact 321 to base 100. In various embodiments of the apparatus, second magnetic contact 321 is rubber coated.

In various embodiments of the apparatus, second magnetic contact 321 creates a second magnetic bond with magnetic wall structure 7, the second magnetic bond being strong enough to at least support the weight of mounting bracket 10 and light source 7 against the magnetic wall structure. The interior wall surface of a chemical tank may include a film, layer, or cake of chemical residue. In various embodiments of the apparatus, second magnetic contact 321 will support mounting bracket 10 against magnetic wall structure 7 without falling, slipping, sliding or otherwise losing its position against the magnetic wall structure 7.

The required strength of the bond between second magnetic contact 321 and magnetic wall structure 7 will vary subject to, among other considerations not included, the composition or type of magnet forming second magnetic contact 321; the composition of magnetic wall structure 7; the presence of any material between second magnetic contact 321 and magnetic wall structure 7 such as a film, layer, or cake, residual from chemical processing; the contact area between second magnetic contact 321 and magnetic wall structure 7; the weight of mounting bracket 10 and light source 5; and any additional factors of safety for among others reasons the forceable pulling or jerking of mounting bracket 10 from magnetic wall structure 7.

In various embodiments of the apparatus, pad 320 further includes handle 325 affixed to pad 320 at a position opposite the pivotally connected second end 312 of arm 310. In various embodiments of the apparatus, handle 325 is positioned and oriented on pad 320 to facilitate positioning or removing second magnetic contact 321 from a magnetic wall structure.

In various embodiments of the apparatus, mounting bracket 10 further include a plurality of arm assemblies. In various embodiments of the apparatus, mounting bracket 10 further includes arm assemblies 400, 500, 600, each pivotally fixed to and in conjunction with arm assembly 300 spaced about arm mount 200; a pads 420, 520, 620 each pivotally connected to an extending end of an arm assembly 400, 500, 600; and each pad 420, 520, 620 having a second magnetic contact 421, 521, 621. In various embodiments, arm assemblies 400, 500, 600 are substantially similar to arm assembly 300. In various embodiments, pads 420, 520, 620 are substantially similar to pad 320.

In various embodiments of the apparatus, mounting bracket 10 includes at least one cord loop 141, 142 for supporting an electrical cord powering light source 5 and for preventing light source 5 or mounting bracket 10 from becoming removed from the magnetic wall structure light mount by the forceable pulling on an electrical cord powering light source 5.

In various embodiments of the apparatus, mounting bracket 10 is designed for use in the presence of flammable dust, vapors or gases. In various embodiments of the apparatus, mounting bracket 10 is designed for use in confined spaces containing flammable dust, vapors or gases. In various embodiments of the apparatus, mounting bracket 10 is made from spark resistant materials. In various embodiments of the apparatus, mounting bracket 10 is coated in spark resistant materials. In various embodiments of the apparatus, base 100, the arm mount 200, light mount 150, at least on arm 310, 410, 510, 610, and at least on pad 320, 420, 520, 620, is made from aluminum. In various embodiments of the apparatus, post 107 is made from aluminum. In various embodiments of the apparatus, the first 120 and second 321, 421, 521, 621 magnetic contacts are coated in rubber.

In various embodiments of the apparatus, mounting bracket 10 includes plate 130 for instructions. By positioning plate 130 on base 100 opposite post 107, plate 130 can be used to facilitate positioning and removing mounting bracket 10 from magnetic wall structure 7.

In various embodiments of the apparatus, mounting bracket 10 includes: base 100 having first magnetic contact 120 on bottom surface of base 100; arm mount 200 affixed to base 100; light mount 150 affixed to base 100; at least one arm 310 pivotally fixed to arm mount 200; and pad 320 pivotally connected to an extending end 312 of at least one arm 310, pad 320 having second magnetic contact 321.

In various embodiments of the apparatus, mounting bracket 10 further including post 107 affixed to base 100 wherein arm mount 200 is slidably affixed to post 107. In various embodiments of the apparatus, post 107 is affixed to a below center position on base 100 when mounting bracket 10 is mounted against a magnetic wall structure 7. In various embodiments of the apparatus, light mount 150 is affixed to post 107 opposite base 100. In various embodiments of the apparatus, post 107 further includes stop 108 spacing arm mount 200 from base 100.

In various embodiments of the apparatus, arm mount 200 further includes threaded bore 221 suitable to pass threaded fastener 222 wherein threaded fastener 222 secures arm mount 200 to post 107 when threaded fastener 222 is threaded through bore 221 and positioned against post 107.

In various embodiments of the apparatus, at least one arm 310 further includes locking bar 313 slidably affixed to at least one arm 310, wherein when at least one arm 310 is in a folded configuration, locking bar 313 is positioned between at least one arm 310 and arm mount 200, and locking bar 313 maintains at least one arm 310 in a folded configuration. In various embodiments of the apparatus, at least one arm 310 further includes ball plunger 314 for securing locking bar 313 to a position on at least one arm 310 whereby locking bar 313 does not slide between at least one arm 310 and arm mount 200.

In various embodiments of the apparatus, pad 320 includes handle 325 affixed to pad 320 opposite the pivotally connected extending end 312 of at least one arm 310.

In various embodiments of the apparatus, first magnetic contact 120 includes at least three magnetic disks 121, 122, 123 secured to the bottom surface of base 100. In various embodiments of the apparatus, second magnetic contact 321 includes a magnetic disk secured to pad 320.

In various embodiments of the apparatus, mounting bracket 10 includes a plurality of arms each pivotally fixed to and spaced about arm mount 200. In various embodiments of the apparatus, mounting bracket 10 further includes at least four arms 310, 410, 510, 610 each pivotally fixed to and spaced about arm mount 200.

Method

FIGS. 5-18 depict various steps in a method of using one embodiment of mounting bracket 10. In various embodiments of the apparatus and method, mounting bracket 10 is used to support light 5 (FIG. 12) from magnetic wall structure 7 of a commercial vessel or chemical tank. In various embodiments of the method, mounting bracket 10 is positioned on a first section of interior wall of a vessel or chemical tank (or first magnetic wall structure 7), and light source 5 is supported from first magnetic wall structure 7. In various embodiments of the method, mounting bracket 10 is further removed from first magnetic wall structure 7 and repositioned on second magnetic wall structure 7', and a light source is supported from a second magnetic wall structure 7'.

In various embodiments of the apparatus and method, first magnetic wall structure 7 includes a location on an interior wall sections of a commercial vessel or tank. In various embodiments of the apparatus and method, mounting bracket 10 may be mounted on a variety of magnetic wall structures 7 geometrically defined between the range of a flat or planar section and an interior section of a cylinder or sphere defined by a radius of 75 feet, 50 feet, 40 feet, 30 feet, 20 feet, 10 feet, or 5 feet. In various embodiments of the apparatus and method, mounting bracket 10 may be mounted on a variety of magnetic wall structures geometrically defined between the range of an exterior section of a cylinder or sphere defined by a radius of 75 feet, 50 feet, 40 feet, 30 feet, 20 feet, 10 feet, or 5 feet and an interior section of a cylinder or sphere defined by a radius of 75 feet, 50 feet, 40 feet, 30 feet, 20 feet, 10 feet, or 5 feet. In various embodiments of the apparatus and method, second magnetic wall structure 7' is another location on the same interior wall section of the same commercial tank on which or in which the first magnetic wall structure is located.

Figure 5:
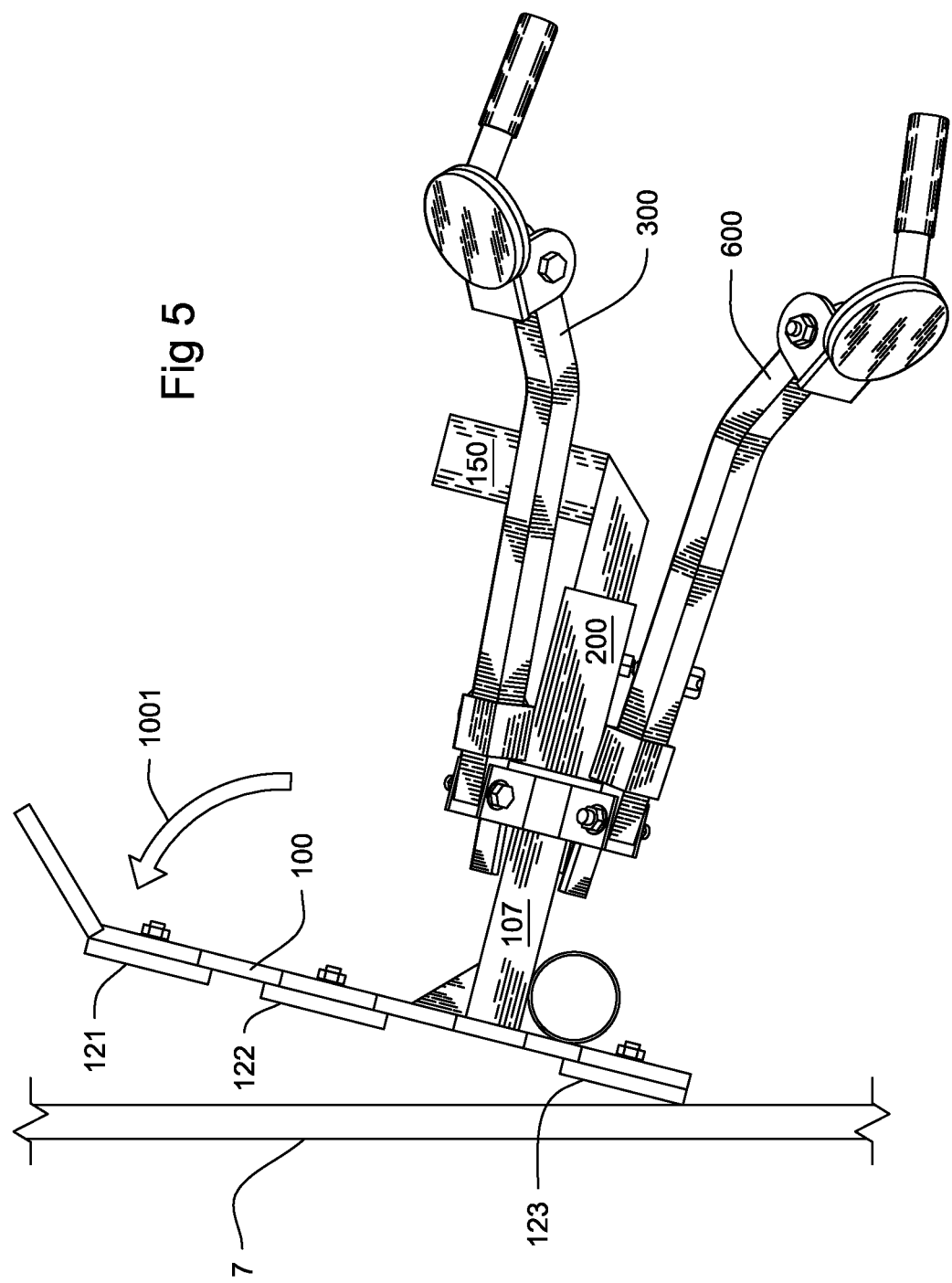
FIG. 5 is a side view of the mounting bracket of FIG. 3 being position against a magnetic wall structure.

In various embodiments of the apparatus and method, before first magnetic contact 120 of base 100 is positioned against a first magnetic wall structure 7, arm assembly 300 or arm assemblies 300, 400, 500, 600 may be in a folded configuration. In various embodiments of the method, the first magnetic contact 120 of base 100 is positioned 1001 against a first magnetic wall structure 7 (FIG. 5). In various embodiments of the method, light 5 is supported from light mount 150 after first magnetic contact 120 is positioned against first magnetic wall structure 7.

Figure 6:
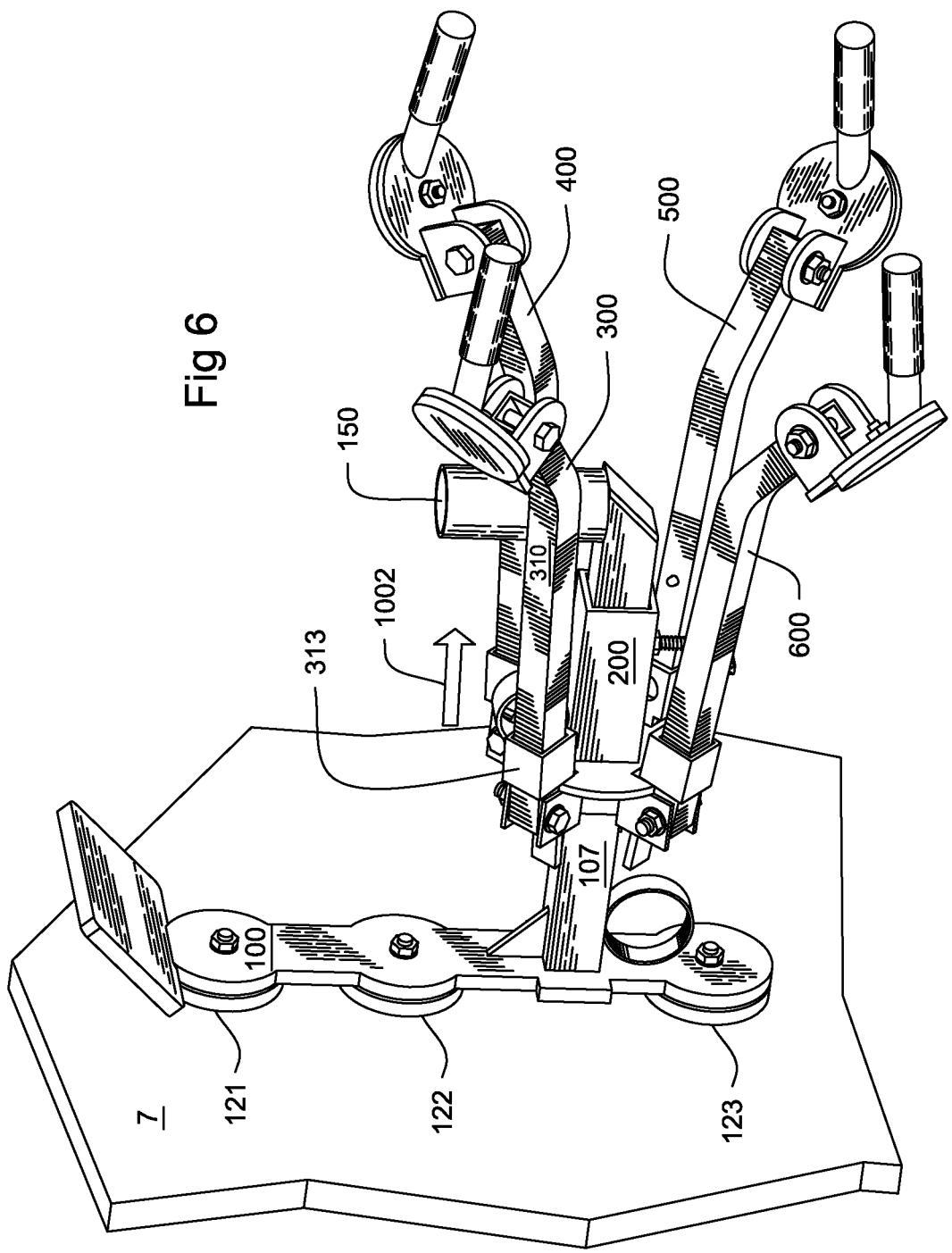
FIG. 6 is the mounting bracket of FIG. 5 from another perspective after it has been positioned against the wall.

In various embodiments of the apparatus and method, locking bar 313 or one of locking bars 313, 413, 513, 613 is removed 1002 from between arm 310 or one of arms 310, 410, 510, 610 and arm mount 200 (FIG. 6). In various embodiments of the apparatus and method locking bar 313 or one of locking bars 313, 413, 513, 613 may be secured by ball plunger 314 or one of ball plungers 314, 414, 514, 614.

Figure 7:
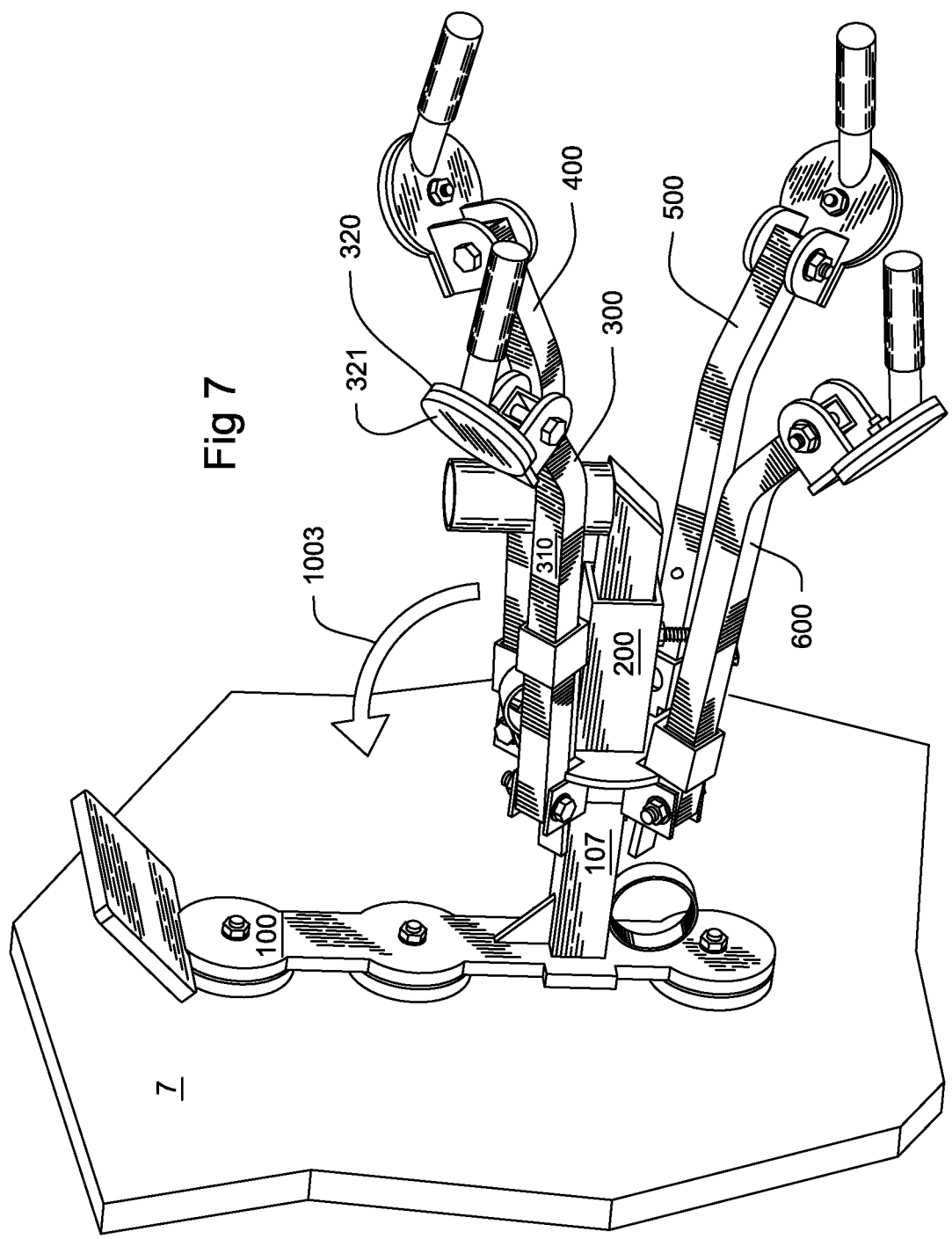
FIG. 7 is the mounting bracket of FIG. 6 with a locking bar removed from between an arm and the arm mount.

In various embodiments of the apparatus and method, after first magnetic contact 120 is positioned 1001 against first magnetic wall structure 7, arm 310 or one of arms 310, 410, 510, 610 is extended 1003 from the folded configuration to bring pad 320 or one of pads 320, 420, 520, 620 in close proximity to magnetic wall structure 7 and to position second magnetic contact 321 or one of second magnetic contacts 321, 421, 521, 621 on magnetic wall structure 7 (FIG. 7). In various embodiments of the invention, fastener 222 is positioned against post 107 after second magnetic contact 321 is positioned against magnetic wall structure 7. In various embodiments of the inventions, light 5 is supported from light mount 150 after second magnetic contact 321 is positioned against magnetic wall structure.

Figure 8:
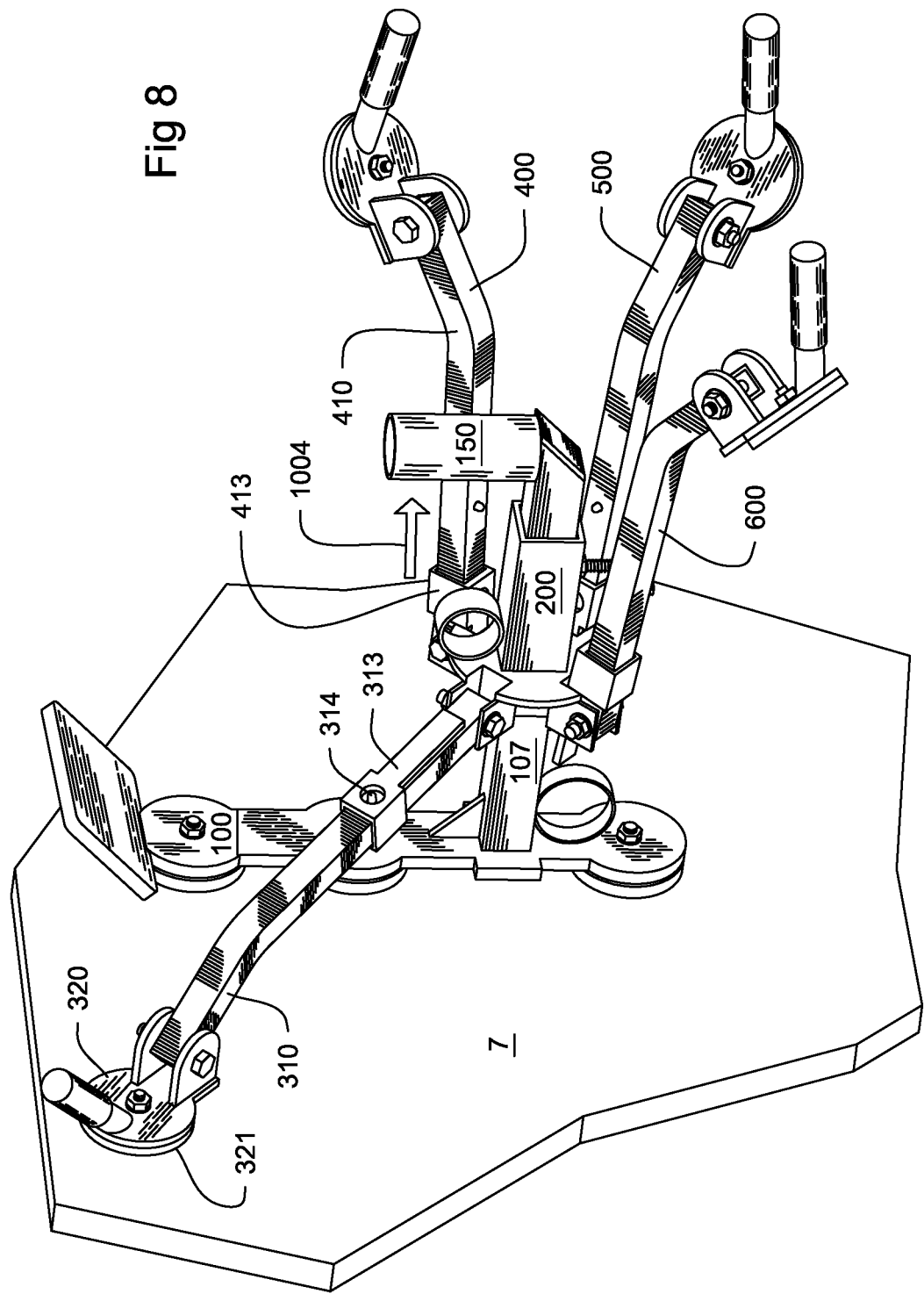
FIG. 8 is the mounting bracket of FIG. 7 with one arm extended from a folded configuration and a corresponding pad positioned against a magnetic wall structure.

In various embodiments of the apparatus and method, after second magnetic contact 321 is positioned against magnetic wall structure 7, locking bar 413 of another arm assembly 400 is removed 1004 from between one of the remaining arms 410 and arm mount 200 (FIG. 8). In various embodiments of the apparatus and method, the locking bar 413 is secured by ball plunger 414.

Figure 9:
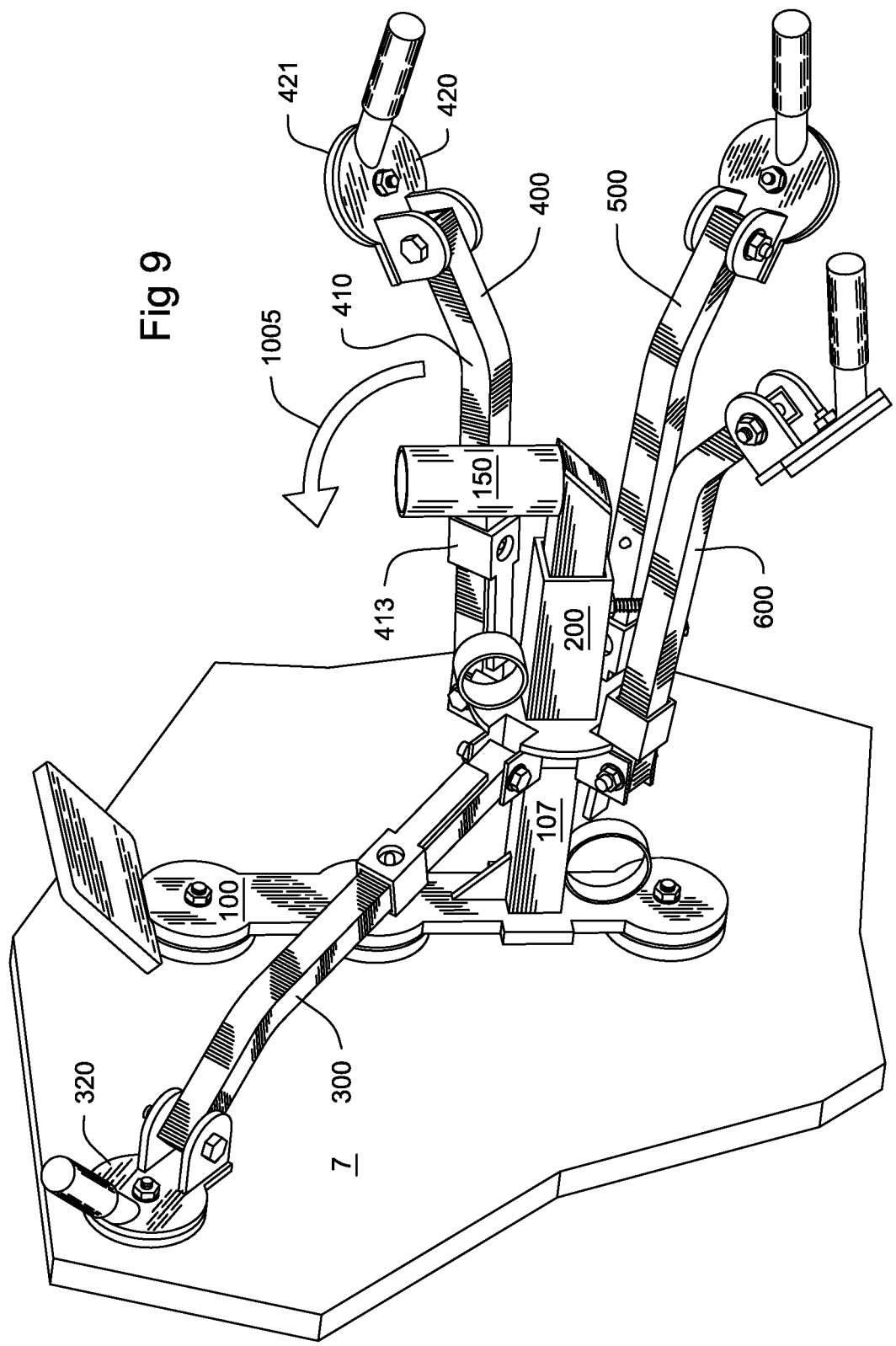
FIG. 9 is the mounting bracket of FIG. 8 with another locking bar removed from between the arm.
Figure 10:
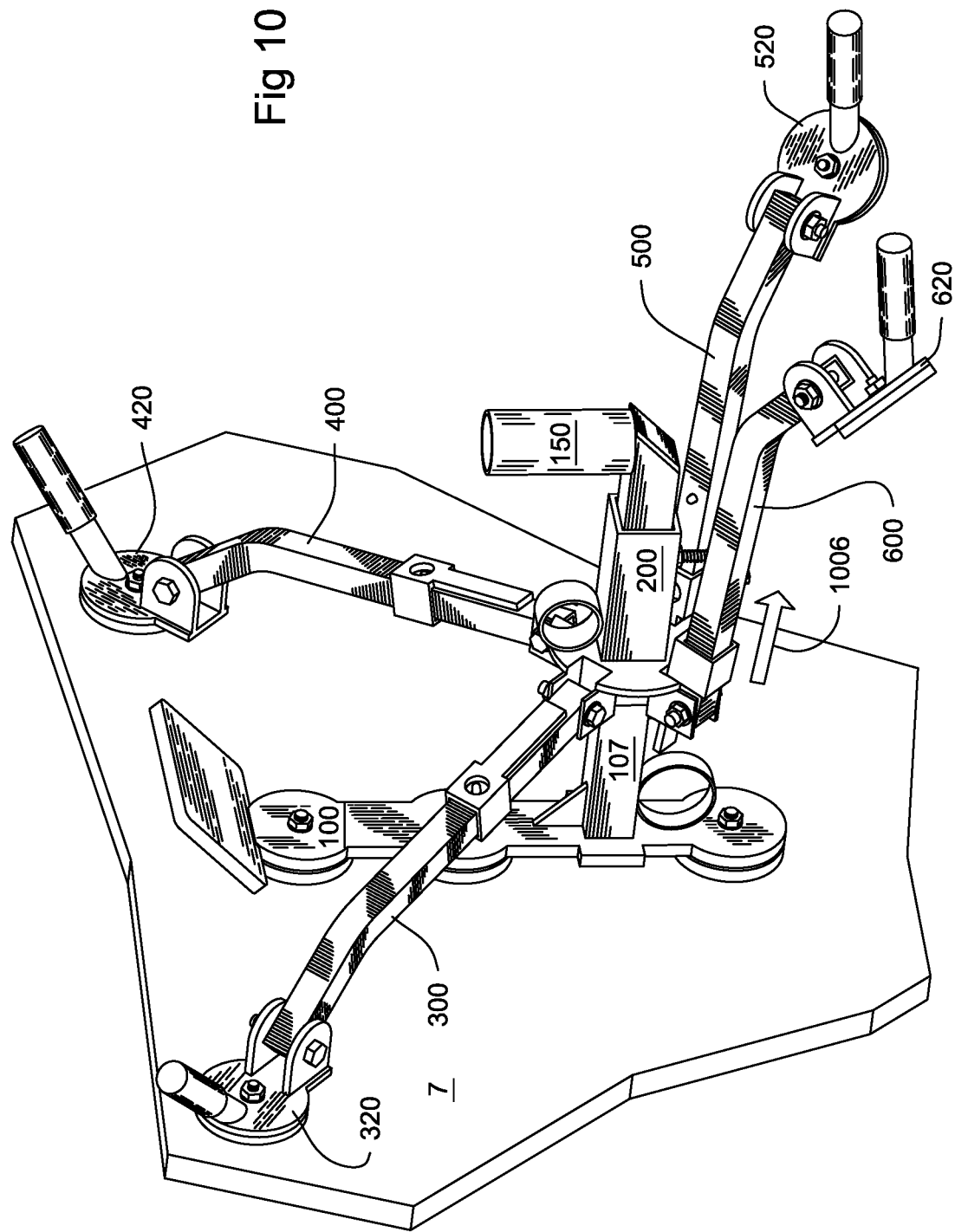
FIG. 10 is the mounting bracket of FIG. 9 with another arm extended from a folded configuration and a corresponding pad positioned against a magnetic wall structure.

In various embodiments of the apparatus and method, after second magnetic contact 321 is positioned against first magnetic wall structure 7, arm 410 is extended 1005 from the folded configuration to bring pad 420 in close proximity to magnetic wall structure 7 and to position another second magnetic contact 421 on magnetic wall structure 7 (FIG. 9). In various embodiments of the invention, fastener 222 is positioned against post 107 after another second magnetic contact 421 is positioned against magnetic wall structure. In various embodiments of the inventions, light 5 is supported from light mount 150 after another second magnetic contact 421 is positioned against magnetic wall structure.

In various embodiments of the apparatus and method, after another second magnetic contact 421 is positioned against magnetic wall structure 7, locking bar 513 of another arm assembly 500 is removed 1006 from between one of the remaining arms 510 and arm mount 200. (FIG. 10) In various embodiments of the apparatus and method, the locking bar 513 is secured by ball plunger 514.

In various embodiments of the apparatus and method, after another magnetic contact 421 is positioned against first magnetic wall structure 7, arm 510 is extended from the folded configuration to bring pad 520 in close proximity to magnetic wall structure 7 and to position another second magnetic contact 521 on magnetic wall structure 7. In various embodiments of the invention, fastener 222 is positioned against post 107 after another second magnetic contact 521 is positioned against magnetic wall structure. In various embodiments of the inventions, light 5 is supported from light mount 150 after another second magnetic contact 521 is positioned against magnetic wall structure.

In various embodiments of the apparatus and method, after another second magnetic contact 521 is positioned against magnetic wall structure 7, locking bar 613 of another arm assembly 600 is removed from between one of the remaining arms 610 and arm mount 200. In various embodiments of the apparatus and method, the locking bar 613 is secured by ball plunger 614.

Figure 11:
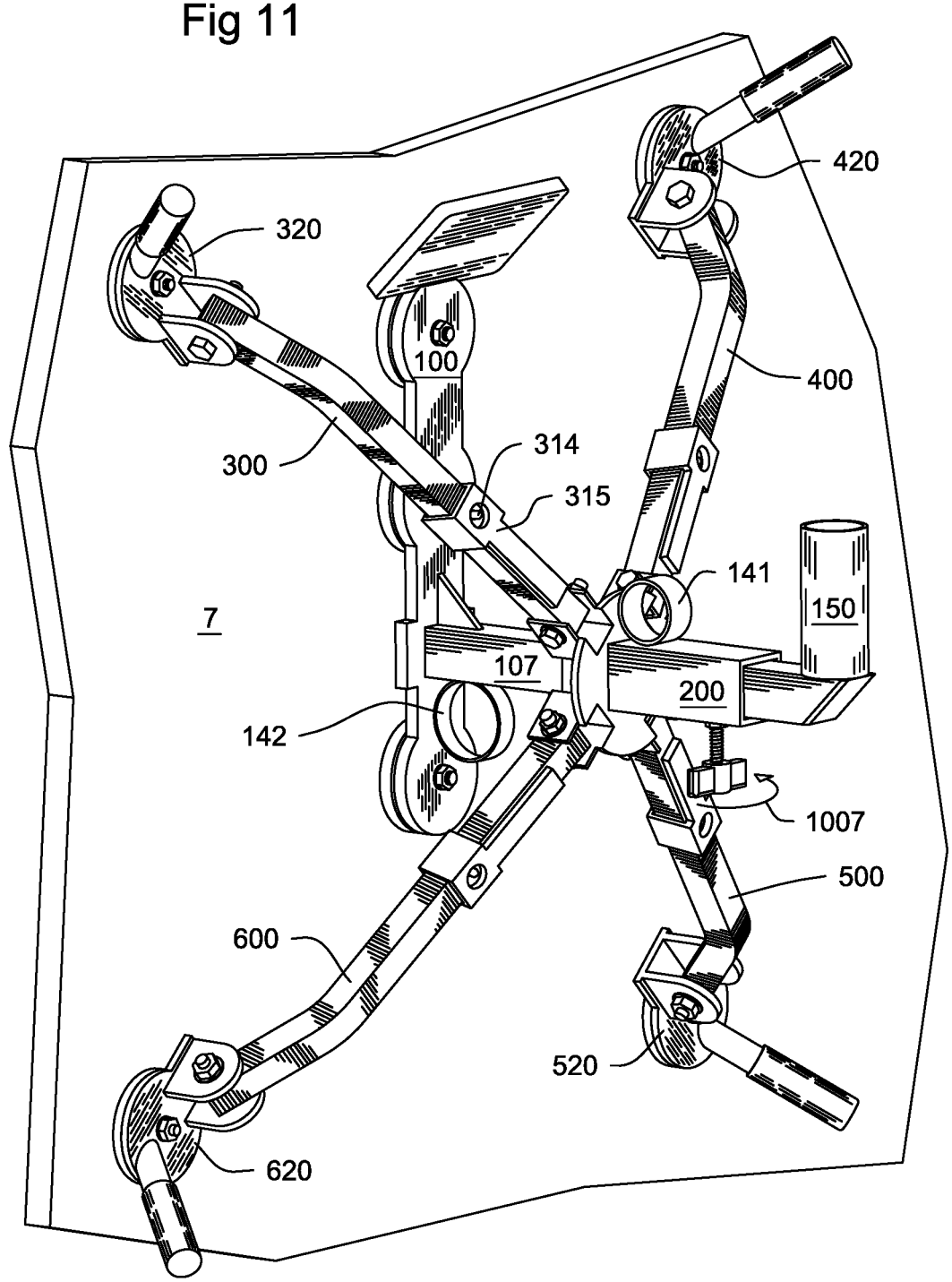
FIG. 11 is the mounting bracket of FIG. 10 with the remaining locking bars removed, the remaining arms extended from a folded configuration, and the corresponding pads positioned against a magnetic wall structure.
Figure 12:
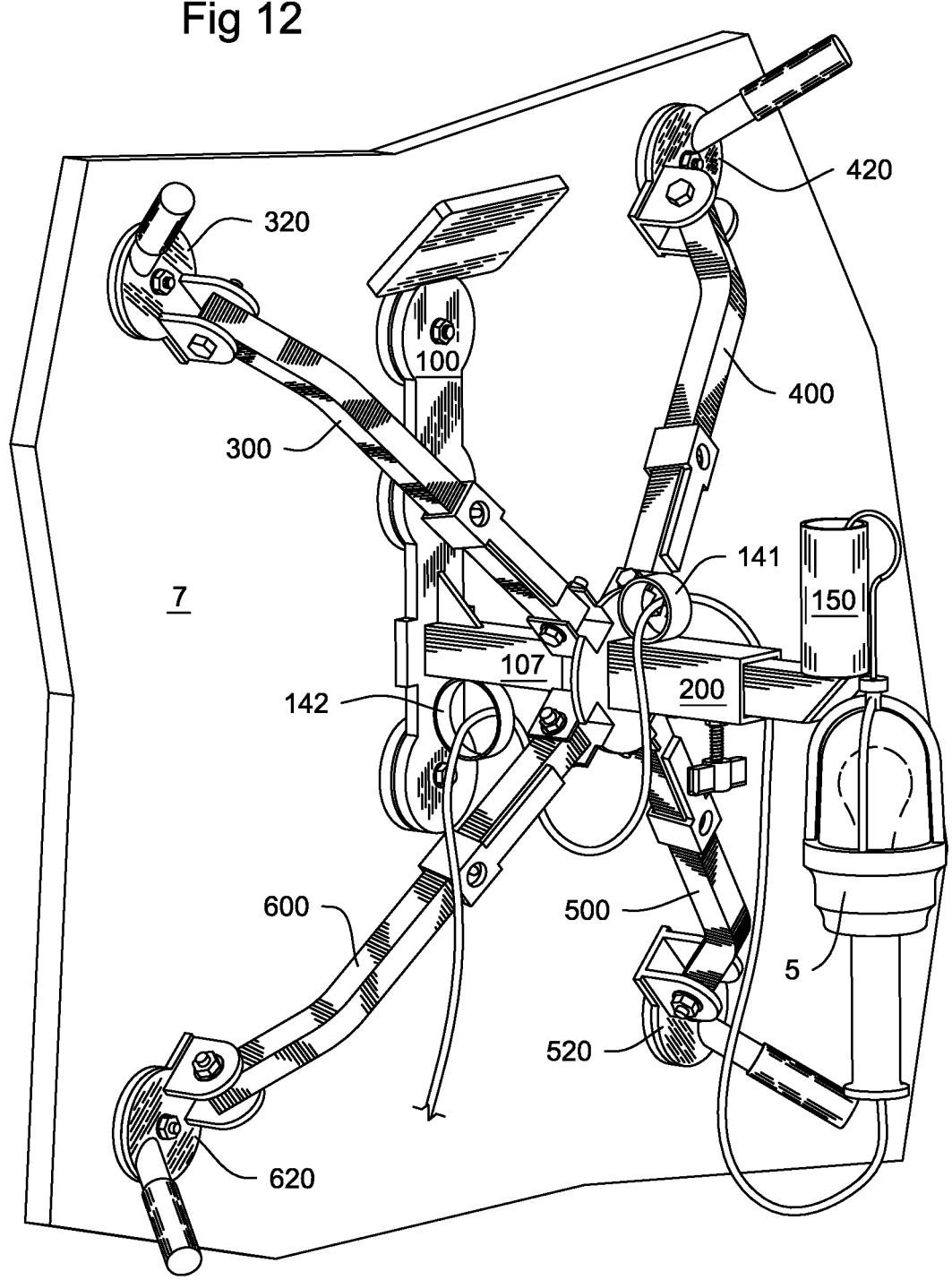
FIG. 12 is the mounting bracket of FIG. 11 supporting a light source.

In various embodiments of the apparatus and method, after another magnetic contact 521 is positioned against first magnetic wall structure 7, arm 610 is extended from the folded configuration to bring pad 620 in close proximity to magnetic wall structure 7 and to position another second magnetic contact 621 on magnetic wall structure 7. In various embodiments of the invention, fastener 222 is positioned 1007 against post 107 after another second magnetic contact 621 is positioned against magnetic wall structure (FIG. 11). In various embodiments of the inventions, light 5 is supported from light mount 150 after another second magnetic contact 621 is positioned against magnetic wall structure. (FIG. 12)

The method is not specific as to the order in which arms 310, 410, 510, 610 are unfolded and second magnetic contacts 321, 421, 521, 621 are positioned against magnetic wall structure. While the specifications disclose unfolding of arm 310, followed by arm 410, followed by arm 510, followed by arm 610, various embodiments of the apparatus and method include all possible orders in which a plurality of arms may be unfolded and second magnetic contacts positioned against magnetic wall structure.

Figure 13:
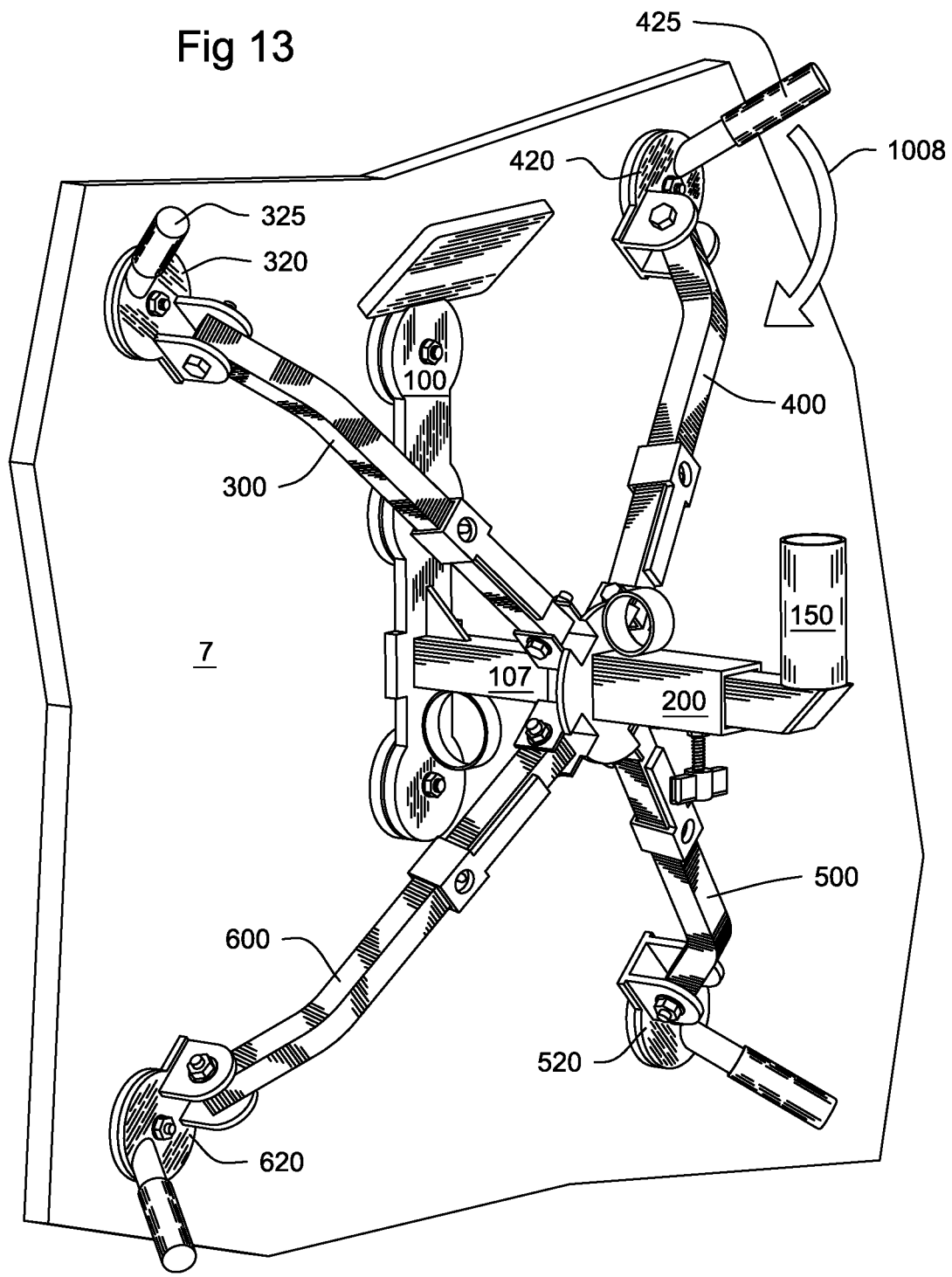
FIG. 13 is the mounting bracket of FIG. 12 without the light source.
Figure 14:
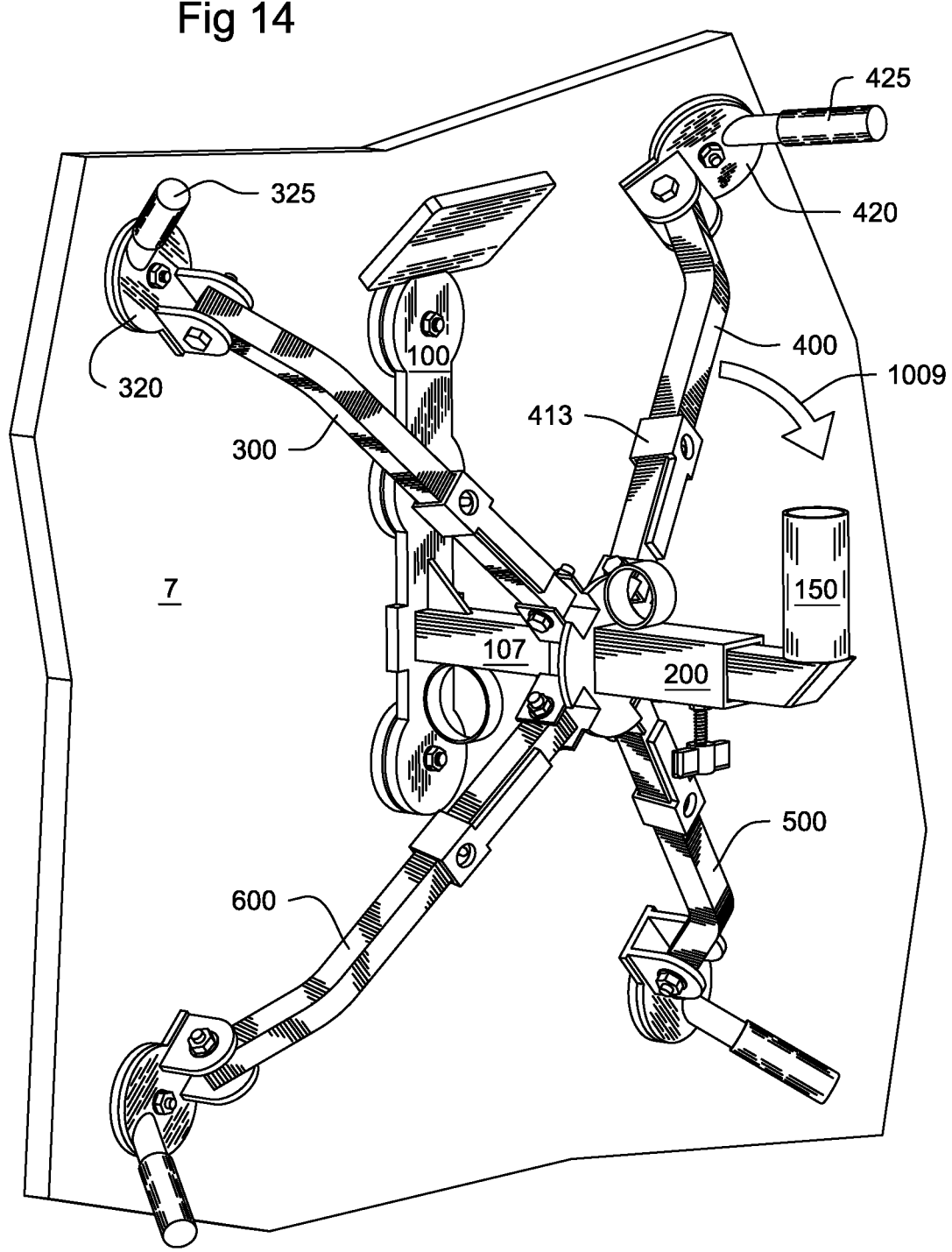
FIG. 14 is the mounting bracket of FIG. 13 with one pad removed from a magnetic wall structure.
Figure 15:
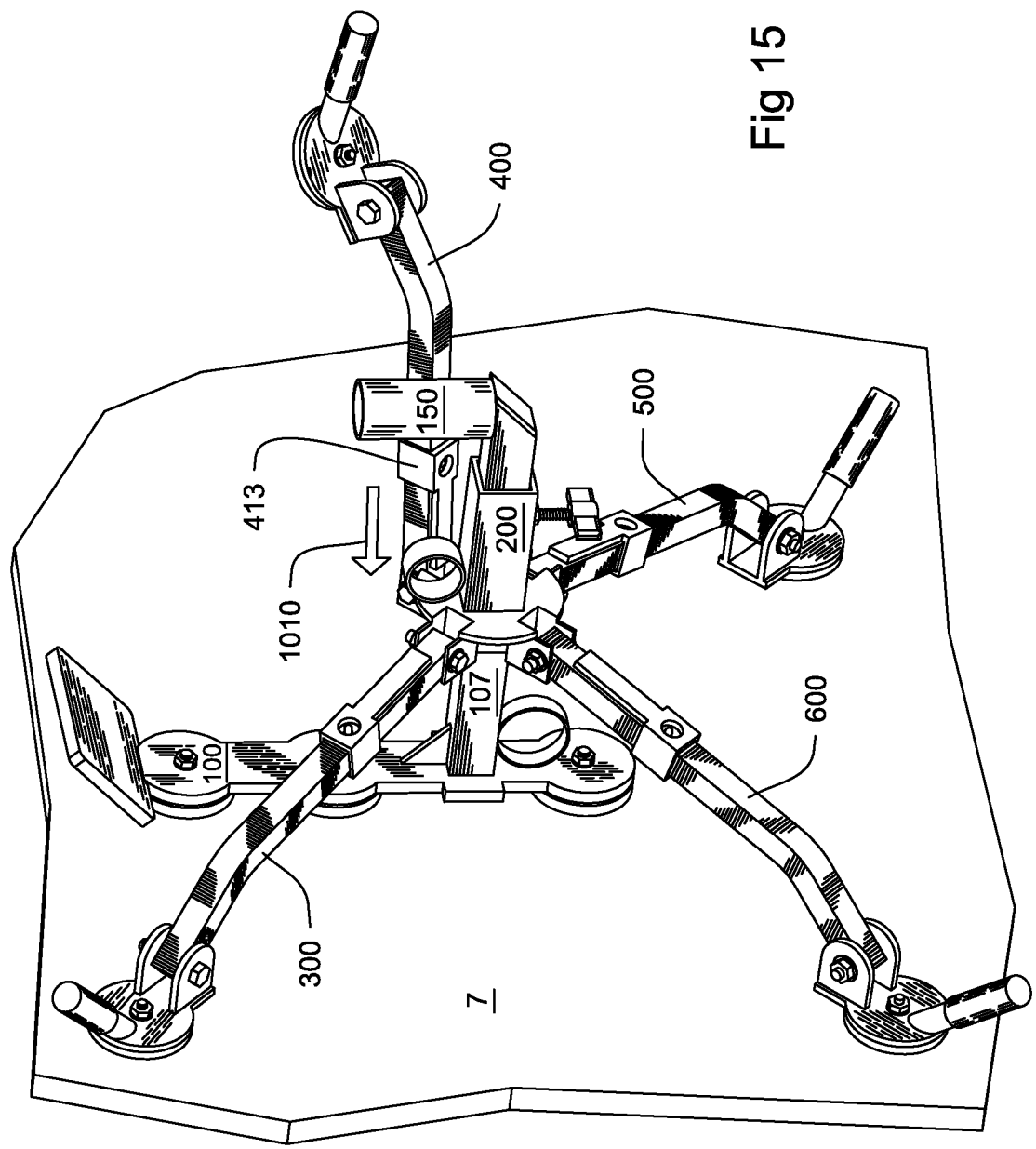
FIG. 15 is the mounting bracket of FIG. 14 with one arm corresponding to the one pad removed of FIG. 14 in the folded configuration.

In various embodiments of the apparatus and method, a second magnetic contact 421 is removed 1008 from magnetic wall structure 7 by pulling handle 425 towards the pivotal joint between arm 410 and pad 420 (FIG. 13). In various embodiments of the apparatus and method, arm 410 is then positioned 1009 in a folded configuration (FIG. 14). In various embodiments of the apparatus and method, locking bar 413 is then positioned 1010 between arm 410 and arm mount 200 (FIG. 15).

Figure 16:
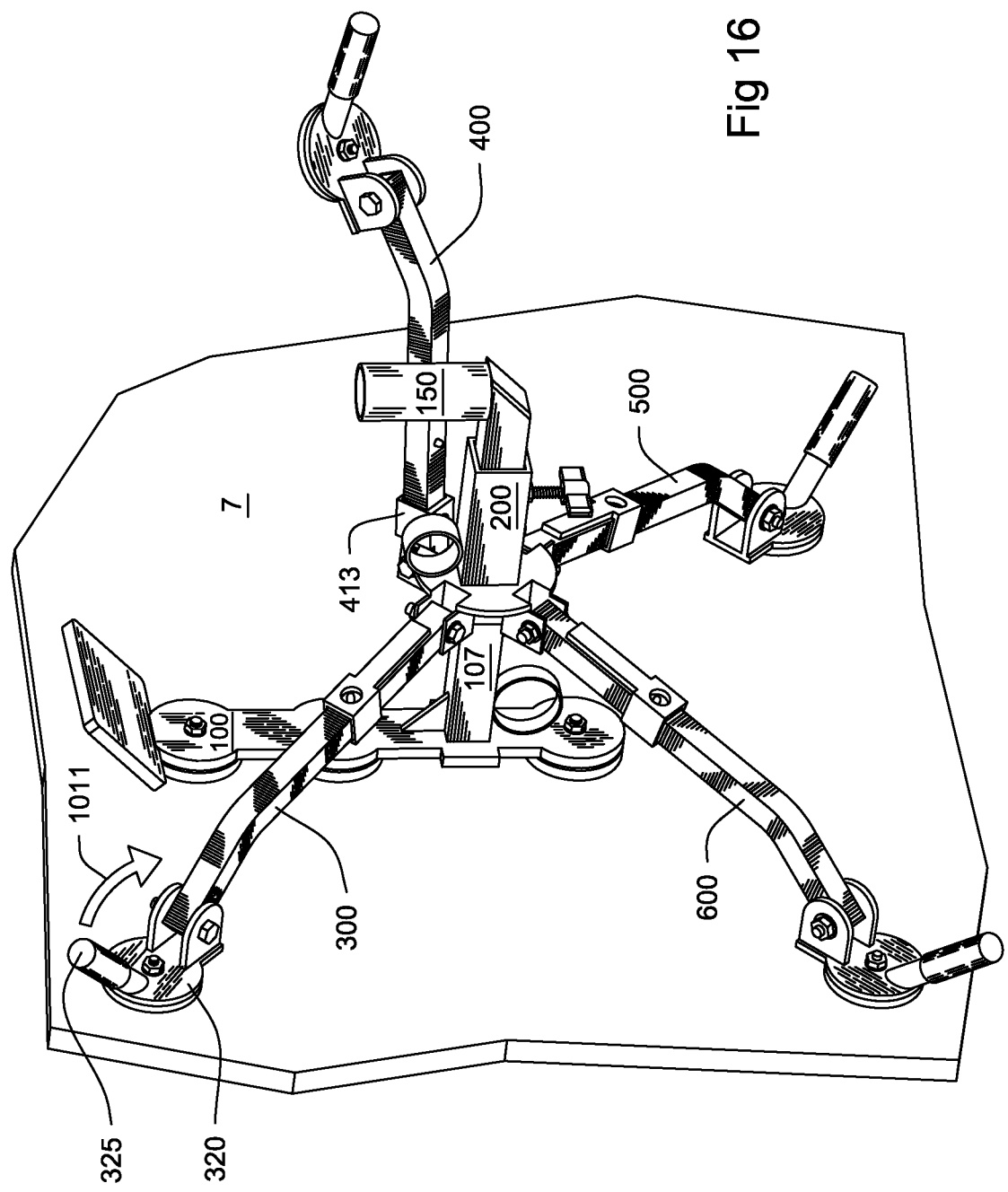
FIG. 16 is the mounting bracket of FIG. 15 with the locking bar of the folded arm of FIG. 15 positioned between the folded arm and the arm mount.

In various embodiments of the apparatus and method, another second magnetic contact 321 is removed 1011 from magnetic wall structure 7 by pulling handle 325 towards the pivotal joint between arm 310 and pad 320 (FIG. 16). In various embodiments of the apparatus and method, arm 310 is then positioned in a folded configuration. In various embodiments of the apparatus and method, locking bar 313 is then positioned between arm 310 and arm mount 200.

In various embodiments of the apparatus and method, another second magnetic contact 521 is removed from magnetic wall structure 7 by pulling handle 525 towards the pivotal joint between arm 510 and pad 520. In various embodiments of the apparatus and method, arm 510 is then positioned in a folded configuration. In various embodiments of the apparatus and method, locking bar 513 is then positioned between arm 510 and arm mount 200.

Figure 17:
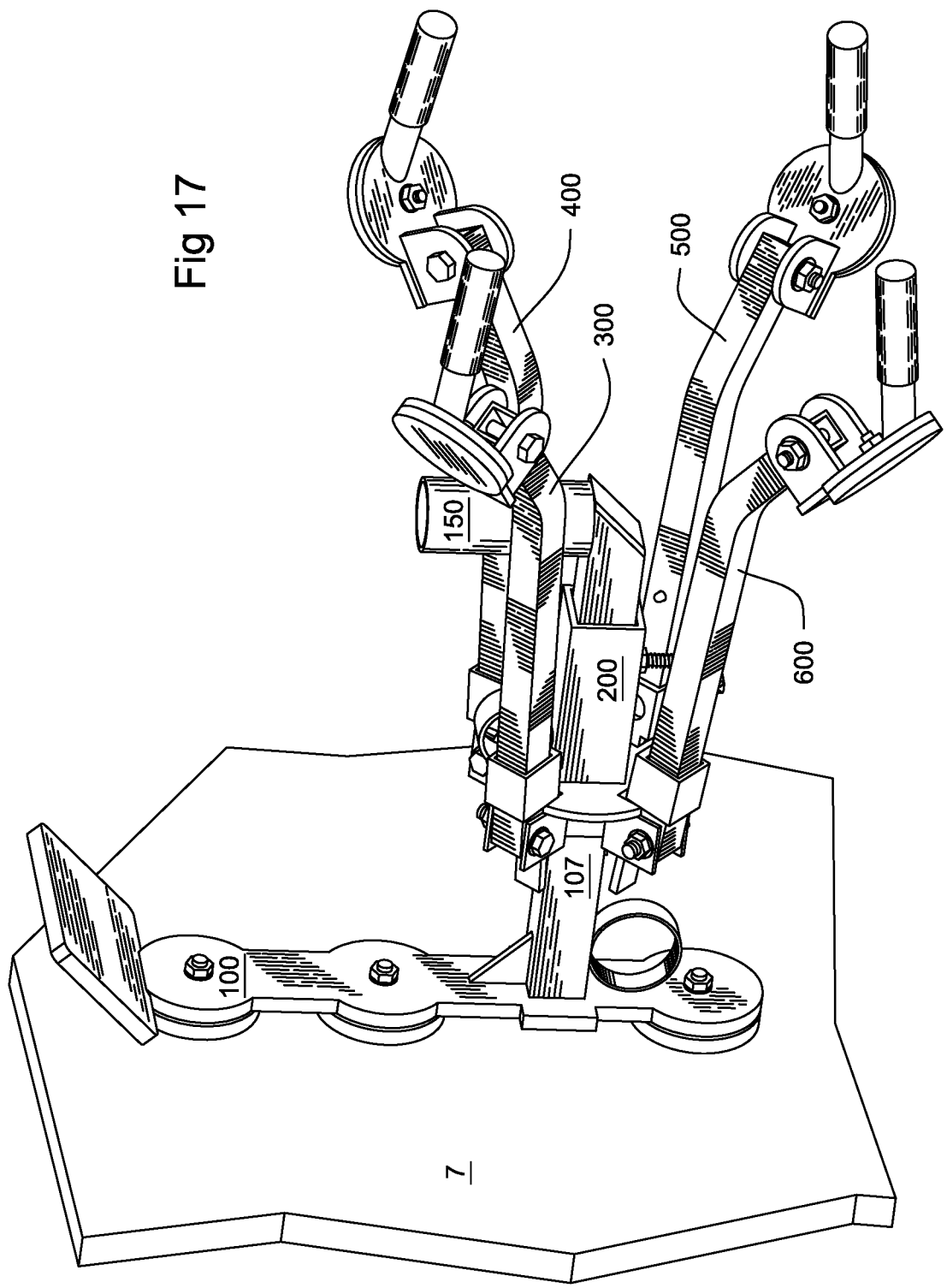
FIG. 17 is the mounting bracket of FIG. 16 with the remaining pads removed from a magnetic wall structure, the corresponding arms in folded configurations, and corresponding locking bars positioned between corresponding folded arms and the arm mount.

In various embodiments of the apparatus and method, a another second magnetic contact 621 is removed from magnetic wall structure 7 by pulling handle 625 towards the pivotal joint between arm 610 and pad 620. In various embodiments of the apparatus and method, arm 610 is then positioned in a folded configuration. In various embodiments of the apparatus and method, locking bar 613 is then positioned between arm 610 and arm mount 200 (FIG. 17).

In various embodiments of the apparatus and method, mounting bracket 10 is removed 1013 from magnetic wall structure 7 (FIG. 18). In various embodiments of the apparatus and method, applying force 1012 to post 107 will facilitate removing 1013 mounting bracket 10 from magnetic wall structure 7 (FIG. 18).

In various embodiments of the apparatus and method, mounting bracket is then positioned on a second magnetic wall structure 7'. Second magnetic wall structure 7' may be another interior wall position of the same commercial tank.

In various embodiments of the apparatus and method, light 5 is supported adjacent a magnetic wall structure 7 according to the following steps: (a) providing a magnetic mounting bracket 10 for supporting a light source including: base 100 having first magnetic contact 120 positioned on a bottom surface of base 100; arm mount 200 affixed to base 100; light mount 150 affixed to 100 base; at least one arm 310, 410, 510, 610 pivotally fixed to arm mount 200; and pad 320, 420, 520, 620 pivotally connected to extending end 312, 412, 512, 612 of at least one arm 310, 410, 510, 610, pad 320, 420, 520, 620 having second magnetic contact 321, 421, 521, 621; (b) positioning first magnetic contact 120 against first magnetic wall 7; (c) after step b, pivotally extending at least one arm 310, 410, 510, 610 towards first magnetic wall 7 and pivotally positioning pad 320, 420, 520, 620 of at least one arm 310, 410, 510, 610 so that second magnetic contact 321, 421, 521, 621 is positioned against first magnetic wall 7; (d) after step b, supporting light source 5 with light mount 150; (e) after step d, removing light source 5 from light mount 150; (f) after step c, removing the second magnetic contact 321, 421, 521, 621 from first magnetic wall 7 and pivotally retracting at least one arm 321, 421, 521, 621 from first magnetic wall 7; (g) after step b, removing first magnetic contact 120 from first magnetic wall 7.

In various embodiments of the apparatus and method, a light 5 is supported adjacent magnetic wall structure 7 according to the additional following steps: (h) after step g, positioning first magnetic contact 120 against second magnetic wall 7'; (i) after step h, pivotally extending at least one arm 310, 410, 510, 610 towards second magnetic wall 7' and pivotally positioning pad 320, 420, 520, 620 of at least one arm 310, 410, 510, 610 so that second magnetic contact 321, 421, 521, 621 is positioned against second magnetic wall 7'; and (j) after step g, supporting a light source 5 with light mount 150.

In various embodiments of the apparatus and method, wherein at least one arm 310, 410, 510, 610 further includes locking bar 313, 413, 513, 613 slidably affixed to at least one arm 310, 410, 510, 610, and wherein locking bar 313, 413, 513, 613 is positioned between at least one arm 310, 410, 510, 610 and the arm mount, locking bar 313, 413, 513, 613 maintains at least one arm 310, 410, 510, 610 in a folded configuration, light 5 is supported adjacent magnetic wall structure 7 according to the additional following steps: (k) after step b and before step c, removing locking bar 313, 413, 513, 613 from between at least one arm 310, 410, 510, 610 and arm mount 200; (1) after step f, positioning locking bar 313, 413, 513, 613 between at least one arm 310, 410, 510, 610 and the arm mount 200; and (m) after step h and before step i, removing locking bar 313, 413, 513, 613 from between at least one arm 310, 410, 510, 610 and the arm mount 200.

In various embodiments of the apparatus and method, wherein pad 320, 420, 520, 620 pivotally connected to an extending end 312, 412, 512, 612 of at least one arm 310, 410, 510, 610 further includes handle 325, 425, 525, 625 affixed to pad 320, 420, 520, 620 opposite the pivotally connected extending end 312, 412, 512, 612 of at least one arm 310, 410, 510, 610, light 5 is supported adjacent magnetic wall structure 7 according to the following addition: in step f, handle 325, 425, 525, 625 is used to remove second magnetic contact 321, 421, 521, 621 from first magnetic wall structure 7.

The preceding description of various embodiments and methods is provided to illustrate certain preferred embodiments of the present invention. This description is not limiting and persons with skill in the art will recognize the existence of other variations on the structures and methods described above. All such variations, to the extent they are consistent with the preceding description and the following claims, are intended to be within the scope of the invention set forth in this patent.

The invention claimed is:

1. A magnetic mounting bracket for supporting a light source comprising:
   a central post having a base;
   a plurality of arms radially disposed about the central post, wherein each of the plurality of arms is pivotally connected to the post, wherein each of the plurality of arms comprises:
      a hinged end proximate the post, an end distal from the post, a body extending between the ends, a pad pivotally mounted to the distal end of each of the plurality of arms, each pad having a bottom surface and a magnet positioned on the bottom surface of the pad, proximate the distal end;
      wherein each of the plurality of arms has a folded position and an extended position, wherein the body of each of the plurality of arms is positioned transverse to the post in the extended position and wherein the body of each of the plurality of arms is proximate the post in the folded position, wherein positioning any one of the plurality of arms in the folded position will position the hinged end of said one arm between the base and the distal end of said one arm; and
   a light mount connected to the post.

2. The magnetic mounting bracket for supporting a light source according to claim 1 wherein each of the plurality of arms further comprises a handle extending from the pad at the distal end of each of the plurality of the arms.

3. The magnetic mounting bracket for supporting a light source according to claim 1 further comprising an arm mount slidably disposed on the post.

4. The magnetic mounting bracket for supporting a light source according to claim 3 wherein the plurality of arms are connected to the post by the arm mount.

5. The magnetic mounting bracket for supporting a light source according to claim 1 wherein each of the plurality of arms is movable between the folded position and the extended position independently of the other arms within the plurality of arms.

6. The magnetic mounting bracket for supporting a light source according to claim 5 further comprising a locking bar positioned on each of the plurality of arms, each locking bar slidably disposed between a locked position and an open position, wherein when each locking bar is in the locked position, each locking bar secures one of the plurality of arms in the folded position.

7. The magnetic mounting bracket for supporting a light source according to claim 6 further comprising a plurality of ball plungers, each of the plurality of ball plungers positioned to secure each locking bar in one of the locked position or the open position.

8. The magnetic mounting bracket for supporting a light source according to claim 1 further comprising a base magnet secured to the base.

\* \* \* \* \*